United States Patent
Van Der Veen et al.

(10) Patent No.: US 7,561,688 B2
(45) Date of Patent: Jul. 14, 2009

(54) EMBEDDING SUPPLEMENTARY DATA IN AN INFORMATION SIGNAL

(75) Inventors: Minne Van Der Veen, Eindhoven (NL); Alphons Antonius Maria Lambertus Bruekers, Eindhoven (NL)

(73) Assignee: Koninklike Philips Electronics N.V., Eindhoven (NL)

( * ) Notice: Subject to any disclaimer, the term of this patent is extended or adjusted under 35 U.S.C. 154(b) by 702 days.

(21) Appl. No.: 10/495,537

(22) PCT Filed: Oct. 24, 2002

(86) PCT No.: PCT/IB02/04456

§ 371 (c)(1),
(2), (4) Date: May 13, 2004

(87) PCT Pub. No.: WO03/042978

PCT Pub. Date: May 22, 2003

(65) Prior Publication Data

US 2005/0025314 A1 Feb. 3, 2005

(30) Foreign Application Priority Data

Nov. 16, 2001 (EP) .................................. 01204387

(51) Int. Cl.
*H04L 21/00* (2006.01)
(52) U.S. Cl. ...................................................... 380/28
(58) Field of Classification Search ................ 380/203, 380/207, 209, 254, 28; 704/200.1, 205, 225; 713/176; 726/31, 32, 33
See application file for complete search history.

(56) References Cited

U.S. PATENT DOCUMENTS 5,319,735 A * 6/1994 Preuss et al. ................ 704/205
5,940,429 A * 8/1999 Lam et al. ................... 375/130

* cited by examiner

*Primary Examiner*—Andrew L Nalven
(74) *Attorney, Agent, or Firm*—Larry Liberchuk (57) ABSTRACT

Disclosed is a method of adjusting a supplementary data signal (wm(n)) to be embedded in an information signal (x(n)), for example an audio signal. The method comprises the steps of determining (107) a relative magnitude (g(n)) of a first property function (Mx(n)) of the information signal averaged over a region of a predetermined size and a second property function ($M_{wm}$(n)) of the supplementary data signal averaged over said region; and adjusting (407) the supplementary data signal according to the determined relative magnitude.

12 Claims, 4 Drawing Sheets

EMBEDDING SUPPLEMENTARY DATA IN AN INFORMATION SIGNAL

This invention relates to embedding supplementary data in an information signal and, more specifically, to adjusting a supplementary data signal to be embedded in an information signal.

In recent years, an increasing trend towards the use and distribution of digital multimedia data has led to an increased need for adequate copy protection, copyright protection, and ownership verification of such data.

Digital watermarking is an emerging technology that may be used for a variety of purposes, such as proof of copyright ownership, tracing of illegal copies, controlling copy control equipment, broadcast monitoring, authenticity verification, adding auxiliary information into multimedia signals, etc.

A watermark comprises supplementary data which is embedded in an information signal by slightly modifying samples of the signal. Preferably, a watermarking scheme should be designed such that the watermark is imperceptible, i.e. that it does not affect the quality of the information signal significantly.

Within the field of watermarking audio signals a number of embedding algorithms are known. For example, in transform-based algorithms coefficients of a digital audio signal are transformed from a time domain into a frequency domain, the coefficients of the transformed signal are modified corresponding to a supplementary data signal, and the modified coefficients are transformed back into the time domain. A general problem of the known approaches is their lack of resolution in the temporal domain. Consequently the supplementary data signal may spread out in time and may introduce perceptible distortions.

In "Robust audio watermarking using perceptual masking", by M. D. Swanson et al. (Signal Processing 66 (1998) 337-355) a method is disclosed where a temporal gain function is calculated by modelling the envelope of the host audio signal. The estimated envelope of the audio signal increases with the audio signal and decays exponentially. The estimated envelope is multiplied to the supplementary data signal prior to its embedding, thereby shaping the supplementary data signal of an audio segment.

However, the above prior art method involves the problem that it can result in an unnecessary reduction of the energy of the embedded data.

The above problem is solved by a method of adjusting a supplementary data signal to be embedded in an information signal, the method comprising the steps of
  determining a relative magnitude of a first property function of the information signal averaged over a region of a predetermined size and a second property function of the supplementary data signal averaged over said region;
  adjusting the supplementary data signal according to the determined relative magnitude.

Consequently, the level of adjustment of the supplementary data signal is determined by the local properties of both the host signal and the supplementary data signal, thereby allowing the supplementary data signal to be attenuated where the audio signal is weak compared to the supplementary data signal and to be amplified where the audio signal is comparably strong. Hence, an adaptive attenuation of the supplementary data signal is achieved which provides a high degree of embedded watermark energy while maintaining the perceptual quality of the final signal.

It is a further advantage of the invention, that it provides a flexible and computationally efficient method of adjusting the supplementary data signal.

According to a preferred embodiment of the invention, the first property function is a local energy function of the information signal and the second property function is a local energy function of the supplementary data signal. Consequently, the local energies of the audio signal and the supplementary data signal are calculated and compared directly. The supplementary data signal is attenuated where its energy accedes the energy of the information signal and amplified elsewhere. Hence, a high degree of watermark energy may be embedded, thereby resulting in an improved performance in terms of detection results versus perceptual quality.

When the first property function is a local magnitude of the information signal and the second property function is a local magnitude of the supplementary data signal, a computationally inexpensive method of adjusting the supplementary data signal is achieved which avoids computationally expensive operations such as squaring and computing a square root.

In some instances, the determined relative magnitude may have undesired behaviour, for example it may become very large, may be rapidly changing in amplitude, etc. When the step of adjusting the supplementary data signal according to the determined relative magnitude further comprises the step of regularising the determined relative magnitude, undesired effects of the temporal gain function may be reduced.

When the step of regularising comprises the step of limiting the amplitude of the relative magnitude to a predetermined maximum value, undesired strong amplification of the supplementary data signal is avoided.

When the step of regularising comprises the step of applying a low pass filter to the determined relative magnitude, rapid changes in amplitude are reduced.

As changes in the relative magnitude of the averaged property functions are delayed compared to the signals, undesired effects may occur, in particular in transient regions where the information signal changes rapidly. To avoid these effects, according to a preferred embodiment of the invention, the step of adjusting the supplementary data signal according to the determined relative magnitude comprises the steps of
  delaying the supplementary data signal by a predetermined delay; and
  adjusting the delayed supplementary data signal according to the determined relative magnitude.

Consequently, the delay of the calculated relative magnitude is compensated for.

When the predetermined delay corresponds to the size of the region, an improved suppression of pre-echo distortions is achieved. As the human auditory system (HAS) is considerably more sensitive to pre-echoes than post-echoes, a suppression of pre-echo distortions may yield an improvement of the perceptual quality of the final signal.

In a further preferred embodiment, the step of adjusting the supplementary data signal according to the determined relative magnitude comprises the steps of
  delaying the supplementary data signal by a delay corresponding to the size of the region resulting in a delayed signal;
  adjusting the delayed signal according to the determined relative magnitude, resulting in a first delayed adjusted signal;
  adjusting the supplementary data signal according to the determined relative magnitude resulting in an adjusted signal;
  delaying the adjusted signal by a delay corresponding to the size of the region, resulting in a second delayed adjusted signal; and
  combining the first and second delayed adjusted signals.

Consequently, an improved suppression of both pre- and post-echo distortions is achieved.

In a yet further preferred embodiment of the invention, the step of determining a relative magnitude further comprises the steps of calculating a third property function;

delaying the third property function to obtain a delayed property function; and combining the third property function with the delayed property function to obtain the second property function.

Consequently, a further improved suppression of those effects is achieved which are caused by the delay of changes in the relative magnitude of the averaged property functions compared to the signals, in particular in transient regions where the information signal changes rapidly.

The invention further relates to an arrangement for adjusting a supplementary data signal to be embedded in an information signal, the arrangement comprising means for determining a relative magnitude of a first property function of the information signal averaged over a region of a predetermined size and a second property function of the supplementary data signal averaged over said region; and means for adjusting the supplementary data signal according to the determined relative magnitude.

The invention further relates to a device for embedding a supplementary data signal in an information signal, the device comprising an arrangement for adjusting the supplementary data signal to be embedded in the information signal, the arrangement comprising means for determining a relative magnitude of a first property function of the information signal averaged over a region of a predetermined size and a second property function of the supplementary data signal averaged over said region; and means for adjusting the supplementary data signal according to the determined relative magnitude.

The invention further relates to an information signal having embedded therein a supplementary data signal, wherein the supplementary data signal has been adjusted by a method comprising the steps of determining a relative magnitude of a first property function of the information signal averaged over a region of a predetermined size and a second property function of the supplementary data signal averaged over said region; and adjusting the supplementary data signal according to the determined relative magnitude.

The information signal may be embodied as a communications signal in a communications network, such as an intranet, extranet, internet, a local area network, a wireless or wired network, etc.

The information signal may further be stored on a storage medium. The term storage medium may include magnetic tape, optical disc, digital video disk (DVD), compact disc (CD or CD-ROM), mini-disc, hard disk, floppy disk, ferroelectric memory, electrically erasable programmable read only memory (EEPROM), flash memory, EPROM, read only memory (ROM), static random access memory (SRAM), dynamic random access memory (DRAM), synchronous dynamic random access memory (SDRAM), ferromagnetic memory, optical storage, charge coupled devices, smart cards, PCMCIA card, etc.

These and other aspects of the invention will be apparent from and elucidated with reference to the embodiments and with reference to the drawings, in which.

Figure 1:
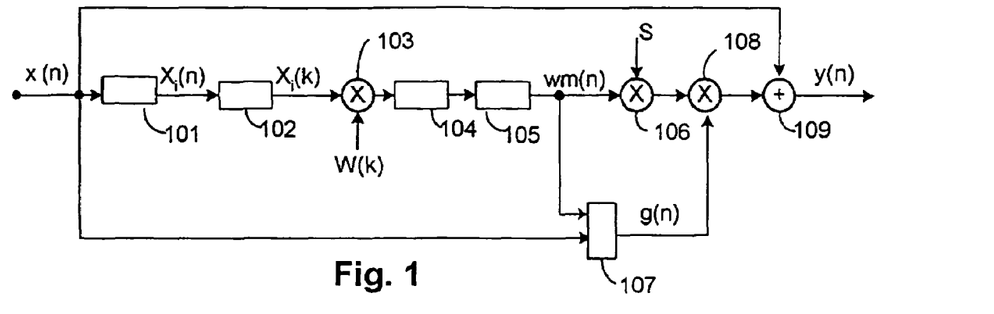
FIG. 1 shows a schematic view of an arrangement for embedding a watermark in an information signal according to an embodiment of the invention.

FIG. 1 shows a schematic view of an arrangement for embedding a watermark in an information signal according to an embodiment of the invention. The arrangement comprises circuitry 101 adapted to segment the host audio signal x(n) into frames $X_i(n)$ and circuitry 102 adapted to transform the frames into the Fourier domain resulting in Fourier coefficients $X_i(k)$, e.g. by applying a Fast Fourier Transform (FFT). The arrangement further comprises a multiplier circuit 103 adapted to slightly modify the Fourier coefficients $X_i(k)$ of each frame according to a watermark sequence W(k), yielding the watermark samples $X_i(k)$ W(k). The watermark sequence W(k) may be a pseudo-random sequence, e.g. a normally distributed pseudo-random sequence with zero mean and unit standard deviation. The arrangement further comprises circuitry 104 adapted to transform the watermarked samples $X_i(k) \cdot W(k)$ into the temporal domain, e.g. by applying an Inverse Fast Fourier Transform (IFFT). Subsequently, the watermark segments are concatenated by circuitry 105 to obtain a reconstructed watermark signal wm(n) which is multiplied with an overall embedding strength s by the multiplier circuit 106. The arrangement further comprises circuitry 107 adapted to calculate a temporal gain function g(n) which is multiplied with the scaled watermark signal s·wm(n) by the multiplier 108. Finally the scaled watermark signal s·g(n)·wm(n) is added to the host audio signal x(n) by the adder 109, resulting in the watermark audio signal y(n) =x(n)+s·g(n)·wm(n).

It is noted that the multiplication in frequency domain, $W(k) \cdot X_i(k)$, corresponds to a cyclic convolution in time domain. Hence, the watermark signal in any given frame i may be expressed as $wm_i(n)=w(n)\tilde{x}_i(n)$, where w(n) is a corresponding watermark signal in the temporal domain.

However, during the step of transforming a watermark frame back into the temporal domain by circuitry 104, watermark energy may spread out over the entire frame. This effect may cause perceptible distortions, in particular in the presence of strong and sudden amplitude changes, as will be illustrated in connection with FIGS. 2a-b. By multiplying the watermarked signal with a suitably chosen gain function g(n), the temporal characteristics of the audio watermark may be improved. A method of calculating such a gain function according to the invention will be described below.

It is understood that other types of mathematical transforms may be employed instead of a Fast Fourier Transform.

examples of such transforms include, Discrete Fourier Transforms (DFT), Discrete Cosine Transforms (DCT), Wavelet transforms, etc.

It is further understood that other embedding schemes may be employed. For example, an FIR watermark filter calculating a linear convolution may used for calculating watermarked audio signals. In contrast to transform-based algorithms, the calculation of a linear convolution does not comprise a segmentation of the host signal x(n). According to this embodiment, the watermarked audio signal is calculated according to the equation y(n)=x(n)+s·g(n)·x(n)▤w(n), where the symbol ▤denotes a linear convolution, i.e. x(n)▤w(n)=Σ$_m$x(m)w(n−m).

Similar to transform-based algorithms as the one described above, an embedding approach based on a linear convolution may suffer from limited temporal resolution and perceptible distortions.

Figure 2A:
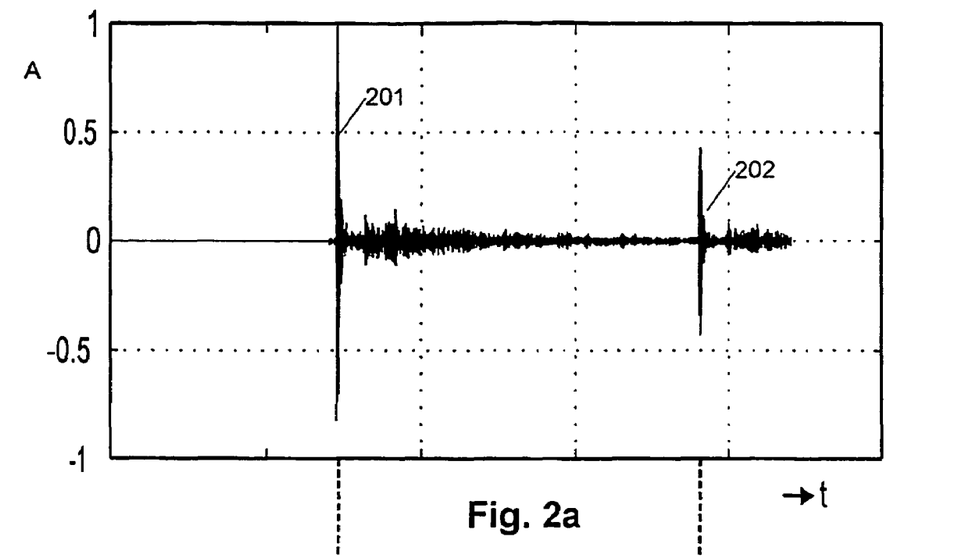
FIGS. 2a-b illustrate the effect of pre- and post-echo distortions in connection with a supplementary data signal embedded in a host audio signal with strong and sudden amplitude changes.
Figure 2B:
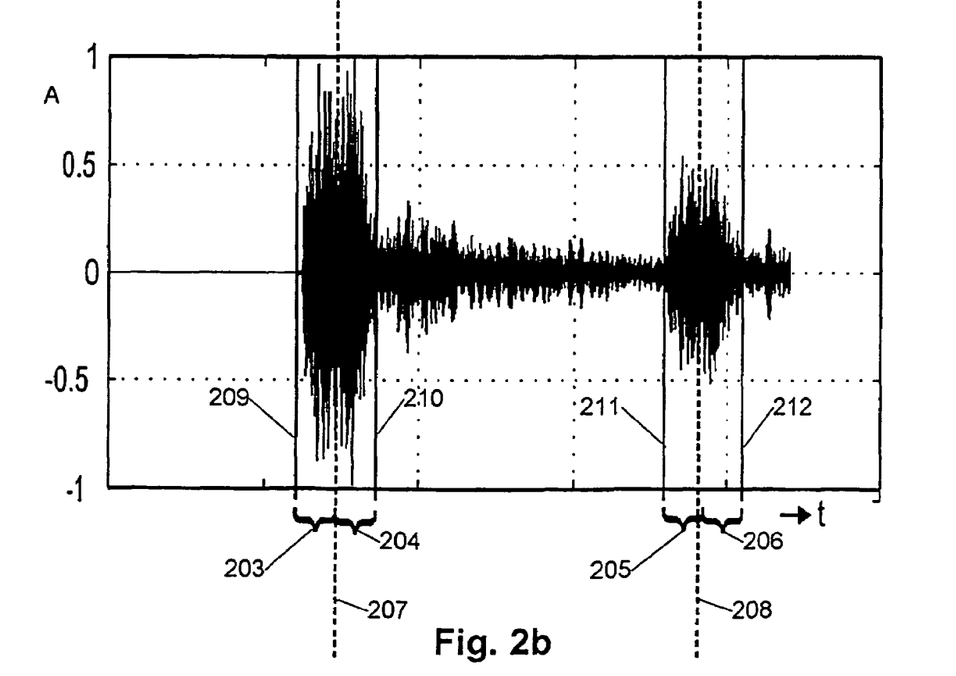

FIGS. 2a-b illustrate the effect of pre- and post-echo distortions in connection with a supplementary data signal embedded in a host audio signal with strong and sudden amplitude changes. FIG. 2a illustrates an example of a host audio signal where the normalised amplitude A is plotted as a function of time t. The audio signal in the example of FIG. 2a represents a short segment of an audio excerpt with castanets which comprises strong and sudden amplitude changes 201 and 202. Such amplitude changes are also referred to as 'attacks' or 'transients'.

FIG. 2b illustrates a watermark signal calculated from the host signal in FIG. 2a according to the method described in connection with FIG. 1, but without the use of a temporal gain function. As can be seen from FIG. 2b, around the locations 207 and 208 of the attacks 201 and 202, respectively, the watermark signal is smeared out over a width corresponding to an analysis frame. The width of an analysis window is indicated by the horizontal lines 209-210 for the attack location 207 and 211-212 for attack location 208, respectively. FIG. 2b further illustrates that the distortions are introduced both before the attack locations, i.e. in the regions 203 and 205, respectively, and after the attack locations, i.e. in the regions 210 and 212, respectively. These distortions may give raise to perceptible pre-echo and post-echo distortions, respectively. Hence, it may be seen from FIGS. 2a-b, that the perceptual distortions introduced by the watermark signal are particularly pronounced in the presence of attacks.

It is an advantage of the invention that it provides a fast and computationally inexpensive method of eliminating perceptual distortions in connection with strong and sudden amplitude changes without the need of determining the locations of such changes. Consequently, possible distortions caused by a failure of detecting an attack are reduced.

Figure 3:
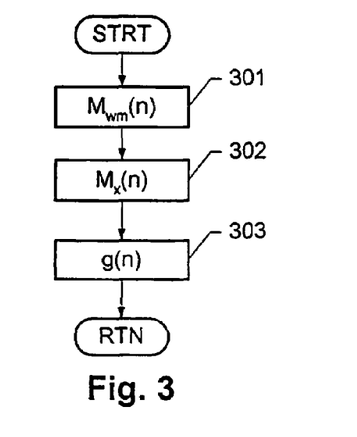
FIG. 3 shows a flow diagram of a method according to an embodiment of the invention.

FIG. 3 shows a flow diagram of a method calculating a temporal gain function for adjusting a watermark signal according to an embodiment of the invention. According to this embodiment, it is assumed that a time-domain watermark signal wm(n) has been generated on the basis of the host audio signal x(n), for example according to one of the methods described in connection with FIG. 1. In step 301, a moving energy of the supplementary data signal is calculated according to $$M_{wm}(n) = \frac{1}{N} \sum_{m \geq 0} wm^2(m)E(n-m).$$

Here, E(n) is a rectangular window function with amplitude 1 and length N, i.e. E(n)=1 for 0≦n<N, and E(n)=0 elsewhere. Preferably, N is chosen to be considerably smaller than the length of the frames in the frame-based embedding scheme or the size of the filter in an FIR based scheme, as described in connection with FIG. 1. If N is chosen very small, the gain function will fluctuate considerably, thereby inducing noise in the signal. If N is chosen large, i.e. of the order of the frame length, the temporal gain function will only vary slowly, thereby reducing the efficiency of suppressing distortions in connection with strong and sudden amplitude changes. In one embodiment of the invention N may be chosen to correspond to approximately 7 msec. In an example of a 44.1 kHz audio with a watermark filter of length 2048 samples, this corresponds to approx. 301 samples. However, it should be noted that this is just an example and that other values ranging from 1-20 msec, or even more, may also be used.

Similarly, in step 302, a moving energy of the supplementary data signal is calculated according to $$M_x(n) = \frac{1}{N} \sum_{m \geq 0} x^2(m)E(n-m).$$

In step 303, the gain function is calculated as the ratio of the calculated energy signals:

$$q(n) = \frac{M_x(n)}{M_{wm}(n) + \varepsilon}.$$

Here, a small parameter ε is added to the denominator in order to prevent a possible division by zero. Preferably, ε is chosen to be a small positive number, i.e. 0<ε<<1. For example ε may be chosen between 0.001 and 0.1. However, other values are possible as well.

The value of q(n) indicates how strong the embedded watermark signal is compared to the host signal. Values of q(n) smaller than 1 indicate that the local energy of the watermark exceeds the local energy of the host signal. Consequently, by multiplying the watermark signal with q(n), the watermark signal is attenuated at these locations. Values of q(n) larger than 1 indicate that the watermark energy is smaller than the host signal. Correspondingly, at these locations the watermark signal is amplified by multiplying it with q(n) while maintaining the perceptual quality.

It should further be noted that the factor 1/N in the above equations may be omitted in the calculation of $M_x(n)$ and $M_{wm}(n)$. When calculating a ratio of $M_x(n)$ and $M_{wm}(n)$, such factors almost cancel and do not have any significant influence on the result.

It should be noted that the steps 301 and 302 do not have to be performed in the order indicated. Alternatively, step 302 may be performed before step 301 or, preferably, steps 301 and 302 may be performed in parallel.

It should further be noted that other property functions measuring local properties of a signal may be used instead of the signal energy. For example, a monotonous function of the energy may be used, e.g. a power of the energy such as the square root of the energy, corresponding to using the quantities $[M_x(n)]^P$ and $[M_{wm}(n)]^P$, p>0, e.g. p=½. According to another embodiment of the invention, the absolute values of the signals x(n) and wm(n), respectively, may be used. Hence, the functions $$M'_x(n) = \frac{1}{N} \sum_{m \geq 0}^{N} |X(m)| E(n-m) \text{ and}$$

$$M'_{wm}(n) = \frac{1}{N} \sum_{m \geq 0} |wm(m)| E(n-m)$$

are calculated instead of $M_x(n)$ and $M_{wm}(n)$, respectively. It is an advantage of this embodiment, that it only requires little computational resources, as it does not involve a squaring operation.

As above, alternatively, a monotonous function of the above quantities $M'_x(n)$ and $M'_{wm}(n)$ may be used, e.g. by omitting the factor 1/N, squaring the quantities, taking a square root, or the like.

It should further be noted that, alternatively to choosing a rectangular window in the calculation of the above averages, other window functions may be used, corresponding to a weighted average, where for example, more recent signal values are gradually weighted stronger than remote ones.

It should finally be noted that, instead of the above ratio, other functions may be used which indicate the relative magnitude of the above local energies, for example any monotonous function of the above ratio, or a regularised ratio as will be described in connection with FIG. 4.

Figure 4:
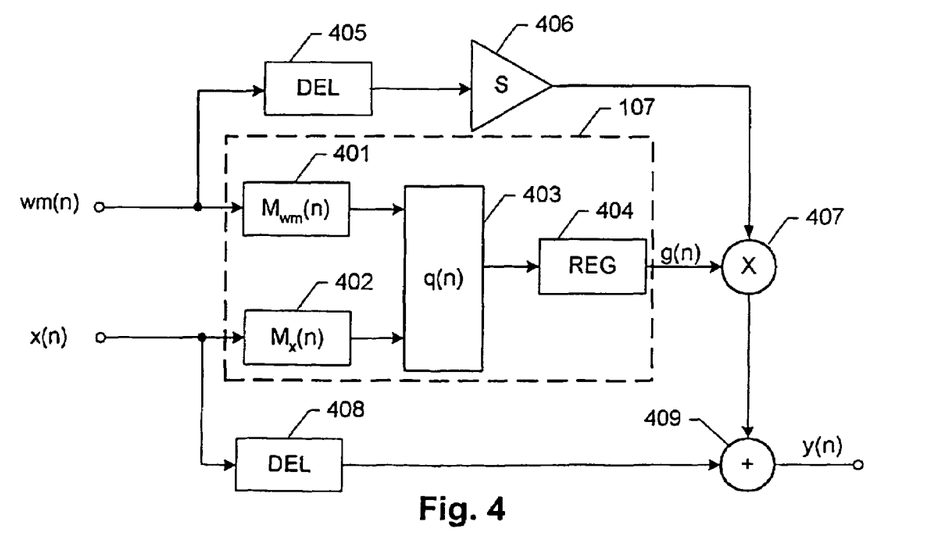
FIG. 4 shows a schematic diagram of an arrangement of adjusting a supplementary data signal according to an embodiment of the invention.

FIG. 4 shows a schematic diagram of an arrangement for adjusting a watermark signal according to an embodiment of the invention. In FIG. 4, it is assumed that a time-domain watermark signal wm(n) has been generated on the basis of the host audio signal x(n), for example according to one of the methods described in connection with FIG. 1. The arrangement comprises a circuit 107 adapted to calculate the temporal gain function. According to this embodiment of the invention, the circuit 107 comprises circuits 401-402 adapted to calculate the moving energies $M_{wm}(n)$ of the watermark signal and $M_x(n)$ of the host signal, respectively, as was described in connection with FIG. 3. In circuit 403, an initial gain function q(n) is calculated as a ratio of the energy of the host signal and the watermark energy as was described in connection with FIG. 3. The arrangement may further comprise a regularization circuit 404 which ensures that the temporal gain function does not exceed a predetermined threshold value $g_{max}$, i.e. the regularization circuit 404 performs the following operation:

$$g(n) = \begin{cases} q(n) & \text{if } q(n) < g_{max} \\ g_{max} & \text{if } q(n) \geq g_{max} \end{cases},$$

resulting in the regularised gain function g(n). The threshold value may, for example, be chosen to 1, if no amplification of the watermark signal is desired. Values $g_{max} > 1$ correspond to a maximum allowed amplification of the signal.

Alternatively or additionally, the circuit 404 may be adapted to perform other regularization operations in order to ensure that the temporal gain function fulfils certain conditions. As an example, applying a low-pass filter ensures that the temporal gain function does not rapidly fluctuate in amplitude.

It is noted that the parameter $\epsilon$ discussed in connection with FIG. 3 also puts a certain constraint on the maximum amplitude of the function q(n).

The arrangement may further comprise a delay circuit 405 which is adapted to delay the watermark signal wm(n) by a predetermined delay value in order to compensate for the delay introduced by the calculation of the moving energies in circuits 401-402. Preferred choices of the delay value will be discussed in connection with FIGS. 5a-d. The overall weight of the watermark is determined by multiplying the watermark signal wm(n) with a global embedding strength s by circuit 406, as was described in connection with FIG. 1. The regularised gain function g(n) is multiplied with the delayed and scaled watermark signal by a multiplication circuit 407. Finally, the watermark signal is added to the host signal x(n) by the adding circuit 409, resulting in the watermarked signal y(n). The arrangement further comprises a delay circuit 408 adapted to delay the host signal prior to the adding circuit 409 corresponding to the delays introduced by the delay circuit 405 and the calculation of g(n).

Figure 5A:
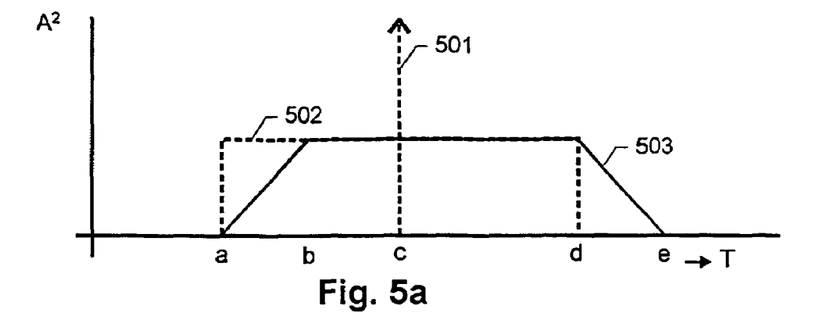
FIGS. 5a-d illustrate the influence of delaying the supplementary data signal according to an embodiment of the invention.

FIGS. 5a-d illustrate the influence of the delay element 405 on the characteristics of the temporal gain function. In general, a linear phase FIR filter with N coefficients introduces a delay corresponding to (N−1)/2, where N is assumed to be odd. Consequently, the calculation of the moving energy introduces a corresponding delay. This is illustrated in FIGS. 5a-d, where a simplified example of a watermark signal is shown. The dotted line 502 illustrates the envelope of the energy of a simplified watermark signal which in FIGS. 5a-d is assumed to result from an audio host signal with a strong attack at position c. In the example of FIGS. 5a-d a synthetic audio host signal is assumed to comprise a delta peak 501 at position c which results in a rectangular watermark signal 502. In FIG. 5a, the corresponding calculated watermark energy signal $M_{wm}(n)$ is illustrated as a solid line 503. As can be seen from FIG. 5a, the averaged energy signal gradually increases over the interval between positions a and b, corresponding to the interval of N signal samples over which the energy is averaged. Correspondingly, the averaged signal energy decreases over the interval between positions d and e. In FIG. 5a, it is assumed that no delay is introduced by the delay element 505. Hence, the characteristics of the solid line 503 corresponds to the characteristics of the local average function $M_{wm}(n)$ which is delayed relative to the input signal wm(n). This delay may result in undesired properties in the transition zone between points a and b where the envelope of the watermark signal increases abruptly while $M_{wm}(n)$. Consequently, the resulting initial gain function q(n) decreases only gradually in the interval between a and b, thereby resulting in an inadequate suppression of the pre-echo signal. The post-echo signal, on the other hand, is sufficiently suppressed, also in the transitional region between d and e.

Figure 5B:
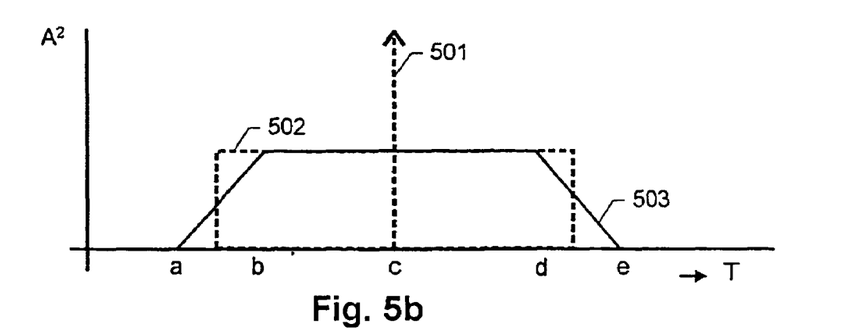

FIG. 5b illustrates the effect of the gain function q(n) when the watermark signal wm(n) 502 is delayed by a delay (N−1)/2, i.e. corresponding to half the length of the averaging interval. As can be seen from FIG. 5b, this delay results in an improved suppression of the pre-echo distortions, whereas now the post-echo distortions in the region between d and e are only partially suppressed.

Figure 5C:
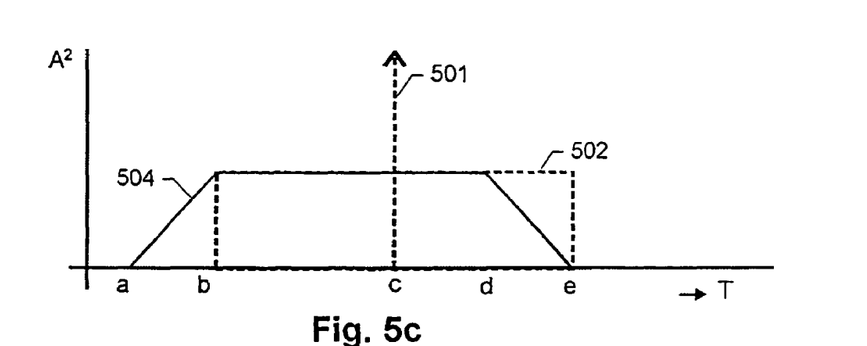

In FIG. 5c the watermark signal is delayed by (N−1) samples corresponding to the length of the averaging window. This delay ensures that pre-echo distortions are cancelled over the entire region between b and c. According to this embodiment, the post-echo distortions are not efficiently suppressed in the region between d and e. However, this may not significantly reduce the perceptual quality of the signal, since the HAS is considerably more sensitive to pre-echoes than post-echoes (see e.g. E. Zwicker and H. Fastl, "Psychoacoustics, Facts and Models", Springer, Berlin, Heidelberg, 1990). Consequently, the choice of a delay corresponding to the length of the averaging window results in improved performance in terms of detection results versus perceptual quality without additional computational complexity.

Figure 5D:
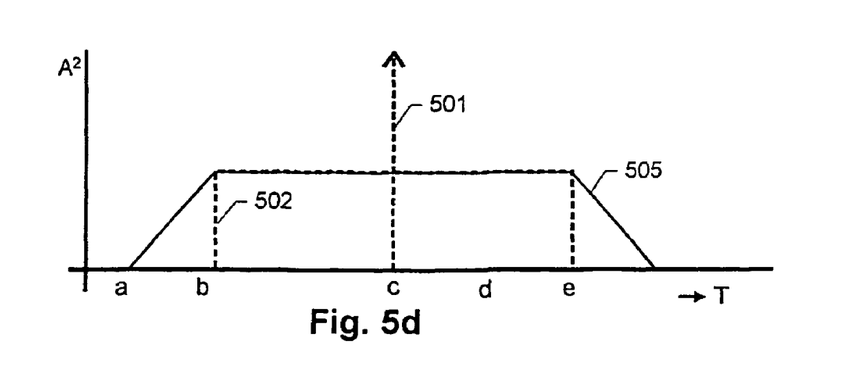

The lack of full post-echo suppression of the embodiment according to FIG. 5c may be solved by a combination of the approaches illustrated in FIGS. 5a and 5c. This embodiment is illustrated in FIG. 5d where both the pre-echo and the post-echo distortions are suppressed. In one embodiment of the invention, this combination may be achieved by an arrangement as illustrated in FIG. 6.

It should be noted that other values of the delay than the examples discussed above may be used, for example delay values between (N−1)/2 and (N−1). For example, instead of N−1, another delay may be used which is equal to or slightly deviates from the length N of the interval used for averaging. As an example, instead of N−1, a delay value of N+1, N−3, N+3, N−5, N+5, or the like, may be used. However, if the delay is chosen to be considerably larger than N, the post-echo effects may become increasingly audible without further improving the pre-echo suppression. A similar consideration applies for the delay (N−1)/2. It will furthermore be apparent to a person skilled in the art that, if N is even, the above delays (N−1)/2 and (N−1) may be replaced by N/2 and N, respectively.

Figure 6:
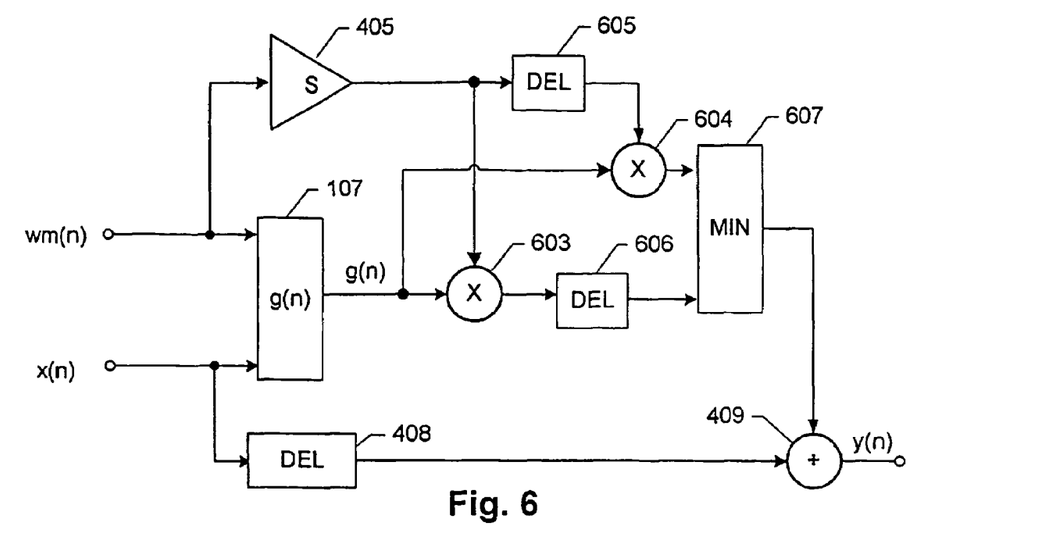
FIG. 6 shows a schematic diagram of an arrangement of adjusting a supplementary data signal according to another embodiment of the invention.

FIG. 6 shows a schematic view of an arrangement according to an embodiment of the invention which implements the combined delays described in connection with FIG. 5d. The arrangement comprises element 107 adapted to calculate the temporal gain function as described in connection with FIGS. 3 and 4. The arrangement further comprises circuit 405 for multiplying the supplementary data signal with a global scale factor s, delay element 408 and adding circuit 409 for combining the information signal with the scaled watermark signal, as described in connection with FIG. 4. According to this embodiment of the invention, the temporal gain function g(n) calculated by circuit 107 is multiplied with the scaled, non-delayed supplementary data signal by multiplier 603. The arrangement further comprises delay element 605 which delays the scaled supplementary data signal, preferably by a delay corresponding to the size of the averaging window as described in connection with FIG. 5c. The delayed signal is multiplied with the gain function g(n) by multiplier 604. Furthermore, the output of the multiplier 603 is delayed by delay element 606 corresponding to the delay introduced by delay element 605. The arrangement further comprises circuit 607 adapted to generate an output corresponding to the minimum of the output of multiplier 604 and the output of delay element 606. Finally the output of the element 607 is combined with the delayed information signal by circuit 409. Consequently, the output of the element 607 corresponds to a supplementary data signal adjusted according to the approach described in connection with FIG. 5d, thereby yielding a suppression of both pre-echo and post-echo distortions.

Alternatively, other ways of implementing the combined delays may be used. For example, from an implementation point-of-view, the efficiency of the calculation may be enhanced by performing the comparison according to circuit 607 inside the circuit 107. Hence, according to another embodiment, the signal $M_{wm}(n)$ which is calculated in circuit 401 may be split, and the split signals may be delayed relative to each other. The delayed versions may then be compared with each other on a sample-by-sample basis and the maximum value may be used as a final version for $M_{wm}$.

Figure 7A:
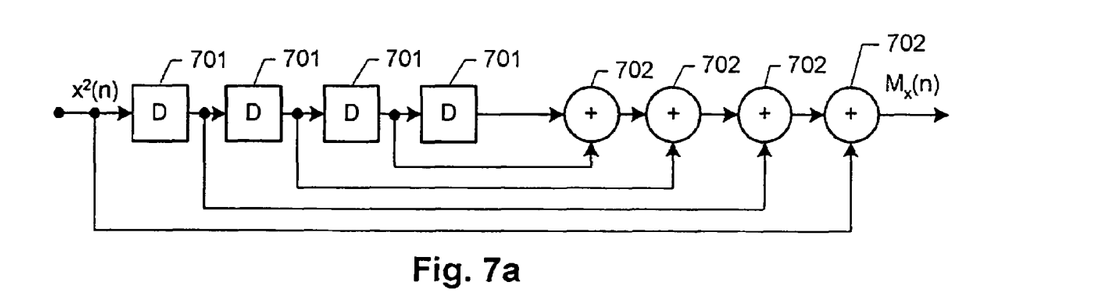
FIGS. 7a-b illustrate two embodiments of arrangements for implementing the filter function E(n) according to the invention.
Figure 7B:
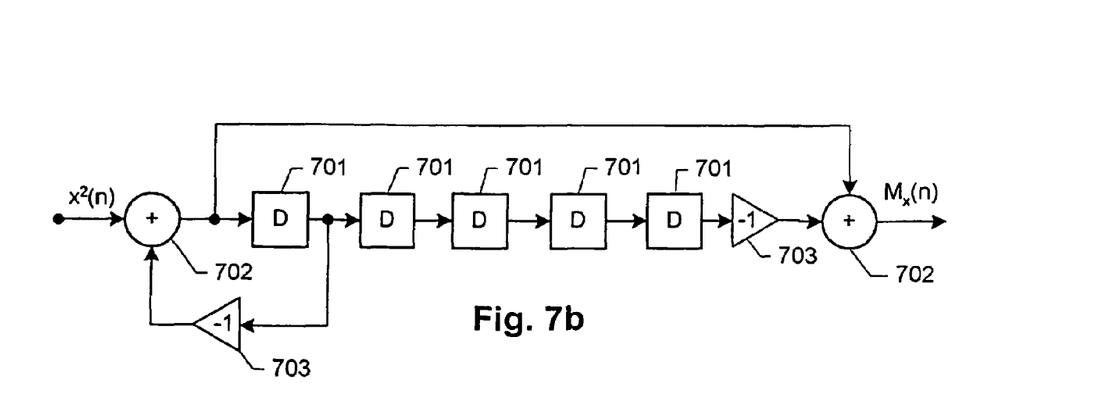

FIGS. 7a-b illustrate two embodiments of arrangements for implementing the filter function E(n) according to the invention. FIG. 7a illustrates an embodiment implementing a forward structure. First it is noted that the special shape of the filter function E(n) in the embodiments of FIGS. 3 and 4 corresponds to a transfer function $$H(z) = \sum_{k=0}^{N-1} z^{-k}.$$

Hence, this filter may be implemented by a forward structure as illustrated in FIG. 7a. In FIG. 7a the structure is illustrated for an example where N=5. The arrangement in FIG. 7a includes 4 delay elements 701 and 4 adders 702. Hence, in the general case an implementation according to the structure illustrated in FIG. 7a requires N−1 adders and N−1 delay elements.

The complexity of an the above arrangement may be reduced significantly by implementing the transfer function as a recursive structure according to $$H(z) = \frac{1-z^N}{1-z^{-1}}.$$

This structure may be implemented according to a so-called "direct form 2" (see e.g. Alan V. Oppenheim and Ronald W. Schafer. "Discrete-Time Signal Processing", Prentice Hall, 1999), as is illustrated in FIG. 7b, again for the example N=5. As can be seen, this implementation requires 5 delay elements 701 while the number of adders 702 is reduced to 2. The elements 703 include a multiplication by a factor (−1), i.e. a change in sign. Consequently, for all choices of N, this implementation reduces the number of adders to 2, while the number of delay elements is increased by one compared to the forward structure of FIG. 7a. Hence, especially for larger values of N, a considerable reduction in the complexity is achieved.

It is noted that other alternative implementations may be used as well. For example, a so-called "direct form 1" structure (see e.g. Alan V. Oppenheim and Ronald W. Schafer. "Discrete-Time Signal Processing", Prentice Hall, 1999) requires N+1 delay elements and 2 adders.

It is understood that the arrangements described in this document may be implemented by any processing unit, e.g. a programmable microprocessor, an application-specific integrated circuit, or another integrated circuit, a smart card, or the like.

It should further be noted that the invention has been described in connection with an embodiment of the invention in the field of watermarking of audio signals. However, it is understood, that the method may be applied to embed other supplementary data into other types of host signals as well, such as multimedia signals, video signals, animations, graphics, still images, or the like. In some embodiments the host signal may be represented in other domains than the temporal domain, such as a spatial domain in connection with pictures, and the notion of amplitude may be replaced by other quantities, such as brightness, intensity, or the like.

It should further be noted that the invention may be applied in connection with a variety of applications where supplementary data signals are embedded in an information signal. For example, in the field of watermarking, supplementary data signals may be embedded as proof of copyright ownership, tracing of illegal copies, controlling copy control equipment, broadcast monitoring, authenticity verification, adding auxiliary information into multimedia signals, etc. As an example, audio watermarks may be embedded in an audio signal by a recorder or other device prior to the distribution of the audio signal, e.g. as a communication signal, stored on a storage medium, or the like.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of adjusting a supplementary data signal (wm(n)) to be embedded in an information signal (x(n)), the method comprising:
    determining a relative magnitude (g(n)) of a first property function ($M_x(n)$) of the information signal averaged over a region of a predetermined size (N) and a second property function ($M_{wm}(n)$) of the supplementary data signal averaged over said region;
    delaying the supplementary data signal by a predetermined delay; and
    adjusting the delayed supplementary data signal according to the determined relative magnitude.

2. The method according to claim 1, wherein the first property function is a local energy function of the information signal and the second property function is a local energy function of the supplementary data signal.

3. The method according to claim 1, wherein the first property function is a local magnitude of the information signal and the second property function is a local magnitude of the supplementary data signal.

4. The method according to claim 1, wherein the adjusting the supplementary data signal according to the determined relative magnitude further comprises regularising the determined relative magnitude.

5. The method according to claim 4, wherein the regularising comprises limiting the amplitude of the relative magnitude to a predetermined maximum value.

6. The method according to claim 4, wherein the regularising comprises applying a low pass filter to a frequency of change of the determined relative magnitude.

7. The method according to claim 1, wherein the predetermined delay corresponds to the size of the region.

8. The method according to claim 1, wherein the determining a relative magnitude (g(n)) further comprises
    calculating a third property function;
    delaying the third property function to obtain a delayed property function; and
    combining the third property function with the delayed property function to obtain the second property function.

9. The method according to claim 1, wherein the information signal comprises a digital audio signal.

10. An arrangement for adjusting a supplementary data signal (wm(n)) to be embedded in an information signal (x(n)), the arrangement comprising:
    means for determining a relative magnitude (g(n)) of a first property function ($M_x(n)$) of the information signal averaged over a region of a predetermined size (N) and a second property function ($M_{wm}(n)$) of the supplementary data signal averaged over said region;
    means for delaying the supplementary data signal by a predetermined delay; and
    means for adjusting the delayed supplementary data signal according to the determined relative magnitude.

11. A device for embedding a supplementary data signal (wm(n)) in an information signal (x(n)), the device comprising an arrangement for adjusting the supplementary data signal to be embedded in the information signal, the arrangement comprising:
    means for determining a relative magnitude (g(n)) of a first property function ($M_x(n)$) of the information signal averaged over a region of a predetermined size (N) and a second property function ($M_{wm}(n)$) of the supplementary data signal averaged over said region;
    means for delaying the supplementary data signal by a predetermined delay; and
    means for adjusting the delayed supplementary data signal according to the determined relative magnitude.

12. A computer readable storage medium having recorded therein instructions for causing a computer to embed a supplementary data signal into an information signal, wherein the supplementary data signal has been adjusted by:
    determining a relative magnitude (g(n)) of a first property function ($M_x(n)$) of the information signal averaged over a region of a predetermined size (N) and a second property function ($M_{wm}(n)$) of the supplementary data signal averaged over said region;
    delaying the supplementary data signal by a predetermined delay; and
    adjusting the delayed supplementary data signal according to the determined relative magnitude.

* * * * *